United States Patent [19]

Keppel et al.

[11] Patent Number: 4,632,791
[45] Date of Patent: Dec. 30, 1986

[54] METHOD FOR PRODUCING FLUID FLOW REGULATORS

[75] Inventors: Wolf D. Keppel, Chicago, Ill.; Reinhard C. Mannesmann, Wartaweil 38 b, 8036 Herrsching, Fed. Rep. of Germany

[73] Assignee: Reinhard Carl Mannesmann, Herrsching, Fed. Rep. of Germany

[21] Appl. No.: 571,699

[22] Filed: Jan. 18, 1984

[30] Foreign Application Priority Data

Jan. 27, 1983 [DE] Fed. Rep. of Germany ....... 3302759

[51] Int. Cl.$^4$ ............................................ B29C 33/00
[52] U.S. Cl. ................................... 264/40.1; 264/219
[58] Field of Search .................. 264/40.1, 219, 220, 264/221, 225, 226, 227, 36, 242; 164/4.1, 150; 204/129.1, 129.2

[56] References Cited

U.S. PATENT DOCUMENTS

| 3,694,610 | 9/1972 | Saito et al. | 204/129.1 |
| 4,224,976 | 9/1980 | Blazek | 164/4.1 |
| 4,495,038 | 1/1985 | Inoue | 204/129.2 |

Primary Examiner—Donald Czaja
Assistant Examiner—Mary Lynn Fertig
Attorney, Agent, or Firm—Schwartz, Jeffery, Schwaab, Mack, Blumenthal & Evans

[57] ABSTRACT

The invention relates to a method of making a fluid flow regulator, in which an elastic ring acts in response to pressure against a profiled core or an inner surface of a casing. It is possible with this method to perform matching of the regulators to a desired value quickly and without excessive waste. To this end the casting moulds for the profiled core or the inner surface are finish-machined in a certain way in dependence on the flow characteristic of the regulator.

12 Claims, 15 Drawing Figures

METHOD FOR PRODUCING FLUID FLOW REGULATORS

BACKGROUND OF THE INVENTION

The invention relates to a method of making fluid flow regulators in which passages are controlled by an elastically deformable ring, depending on the overpressure of the medium being controlled, which acts on said ring, thereby narrowing the passages.

Particularly the invention is related to a fluid flow regulator as specified in U.S. Pat. No. 3,847,178, issued Nov. 12, 1974.

As is described in that Patent, the various parts of the regulator, in particular the profiled core or the profiled inner wall of the casing, respectively, are preferably made as injection moulded plastic articles. The rate of flow through the regulator is determined by the size of the flow ports and thus by the shape of the protuberances. In this connection the protuberances may be of different height so that there are distinct main protuberances and lower supporting protuberances interposed therebetween.

It has been found in practice that the rate of flow through the regulator is extremely sensitive with respect to variations of the employed rings. The tolerances of these rings vary both with respect to dimensions and their elastic properties from one charge to the next so that, when large numbers are to be manufactured, there arises the problem of matching the casting moulds, which are also called injection cavities, to the respective charge of rings.

This means that a certain type of fluid flow regulator cannot be made with a single casting mould, i.e., a master mould, but that in the course of time a series of casting moulds has to be prepared and matched in such a way that the regulator made with the respective casting mould will have the predetermined desired flow value. Moreover, in the manufacture of the moulded parts the casting moulds are subject to wear and contamination so that their useful life is limited to the production of e.g. 50,000 castings. Thereafter, the tolerance variations of the moulded parts are so great that the flow characteristics of the regulators formed thereby deviate greatly from the desired value, so that a new casting mould will have to be used.

However, the making of such casting moulds poses a problem. The geometry of the profiled parts of the regulators is such that the corresponding casting moulds can hardly be made with cutting or milling machines so that preferably an electrical discharge machining method (EDM method), i.e., a spark erosion method or an electrolytic method, is employed. A casting mould made thereby cannot even by the use of an EDM method be produced with such accuracy that the moulded parts formed thereby result in a regulator having exactly the predetermined rate of fluid flow. The thus prepared casting mould is a "blank" of a casting mould and must therefore be matched and adapted such that the moulded parts taken therefrom result in a regulator exhibiting the predetermined desired value. For matching, the casting mould is changed so that the geometric configuration of one or several protuberances, i.e., of the main or the supporting protuberances, is changed. This is done, for instance, by cutting the casting mould with an abrasive diamond pencil.

Since the casting moulds made by means of EDM methods are relatively expensive, matching has to be performed very carefully so that the casting mould will not become useless due to excessive material removal. Therefore it has been necessary so far to finish-machine the casting mould with a large number of finishing steps and to make a sample after each single finishing step and measure the flow characteristic thereof, which is a time consuming and expensive process.

It is therefore the object of the present invention to provide measures by means of which the making of a fluid flow regulator of the above-specified type may be facilitated, and in particular to provide rules according to which a casting mould may be matched with the minimum number of machining steps in such a manner that the regulator parts produced thereby result in a regulator having the predetermined desired value for the fluid flow rate.

SUMMARY OF THE INVENTION

The method according to the invention is based on investigations conducted by the inventors in respect of the action of the regulator described in above noted U.S. Pat. No. 3,847,178.

The inventors have found that in such a regulator the elastic ring is deformed in two ways due to the differential pressure that will be developed. A ring of e.g. circular cross-section will be compressed due to the differential pressure to a flat, e.g. elliptical, cross-sectional shape so that the ring is moved towards the protuberances of the profiled core or the profiled inner surfaces, respectively, and constricts flow ports. The differential pressure here is the difference between the pressure at the inlet side and the pressure at the outlet side of the regulator. Upon an increase of the differential pressure the ring is deflected relative to its circumferential direction and is moved into the flow ports. According to the investigations, the flow characteristic of the regulator is influenced by the resulting ratio between the flattening of the ring to a plane cross-section and the deflection of the ring. This ratio is in turn determined by the shape of the recesses and thus by the shape and the spacing of the protuberances. If the width of the recesses is relatively large in respect of the ability of the ring to deflect, the ring may with increasing pressure close the flow port to a great extent so that the flow characteristic, after having passing through a maximum at about 1 bar, will drop again. If, on the other hand, the spacing between the protuberances is relatively small, the elastic ring cannot be deflected to a given extent into the flow passages so that from a given differential pressure the regulator action ceases and the rate of flow increases approximately linearly with the pressure. The actual conditions are much more complex because the fluid does not pass through the flow ports as a laminar flow but the flow is turbulent.

If the sample of a regulator, which has been produced in a casting mould, exhibits a flow characteristic which after having reached a maximum will progressively drop with increasing pressure, the depth of the flow ports will be increased in accordance with the invention. If, on the other hand, the flow characteristics of the sample after reaching a maximum initially drops with increasing pressure and thereafter rises again linearly, this will mean according to the inventors' investigations that the width of the flow ports must be enlarged. Thus, there result the measures specified in the "main claim" with respect to the matching of the casting mould.

The advantage achieved by the invention resides in that matching of the casting moulds may be performed purposefully and quickly and with little waste, whereas so far the matching rather constituted a "trial" with random results and, of course, a large amount of useless casting moulds.

When matching is based on a desired value which is reached by the regulator sample taken from the slave mould at a differential pressure between 0.2 and 0.5 bar, especially at about 0.3 bar, matching is facilitated because then the regulator characteristic may be matched both to an increased and a decreased rate of flow.

The adjusting and finishing-machining of the casting mould is further faciliated and less sensitive to excessive material removal when provision is made to the effect that the protuberances which determine the flow ports extend at an inclination relative to the axis of symmetry (longitudinal axis) of the regulator, preferably at an angle of about 3° to 15°, especially of about 10°.

As was already mentioned, matching may be performed by removal of material from the casting mould with an abrasive diamond pencil.

According to a preferred embodiment of the invention matching is performed by so-called wire erosion, i.e., an EDM method with a wire electrode. This enables the purposeful removal of very small amounts of material from the casting mould, so that high precision is obtained. It is also possible to employ an electrolytic method for the removal of material. This should be considered particularly when the surface of the casting mould is to be also microscopically smooth.

Embodiments of the invention will be described below with reference to the accompanying drawings.

DETAILED DESCRIPTION OF PREFERRED EMBODIMENT

Figure 1:
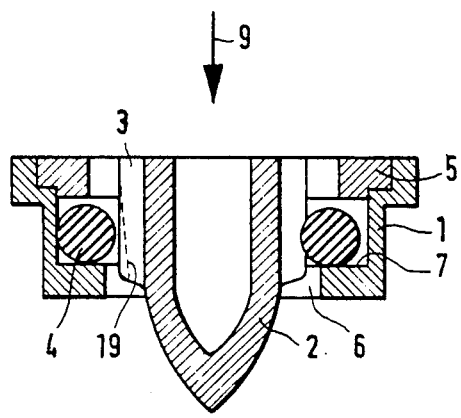
FIG. 1 is a cross-sectional view of a first regulator design with which the invention may be used.

FIG. 1 is a cross-sectional view through a first type of regulator as specified in U.S. Pat. No. 3,847,178 the whole of which is incorporated herein by reference. The regulator comprises a casing 1 with a core 2 disposed therein. The core is provided with individual protuberances 3 which may protrude to varying extent from the central axis of the core. A rubber ring 4 is disposed about the core. The flow ports 6 are defined by the rubber ring 4 and the profile of the core 2. Above the rubber ring 4 the casing is closed by a cover plate 5. The direction of liquid inflow is indicated by the arrow 9. Due to the differential pressure developing between the inlet and the outlet side the rubber ring will be deformed and moved towards the protuberances 3 of the core 2 so that the flow ports 6 will be increasingly restricted with increasing pressure, while the ring moves on the sliding surface 7 of the casing 1.

Figure 2:
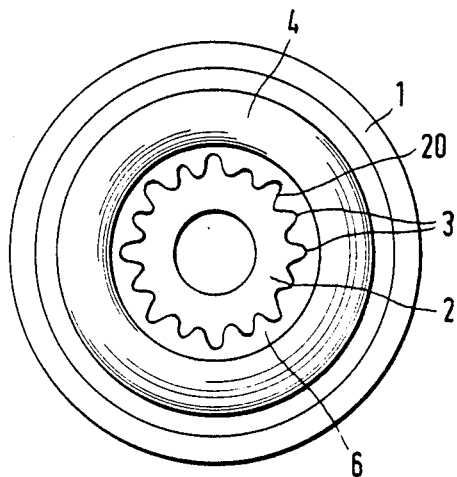
FIG. 2 is a plan view of the regulator according to FIG. 1.

FIG. 2 is a plan view showing the relative arrangement of ring 4 and core 2.

Figure 3:
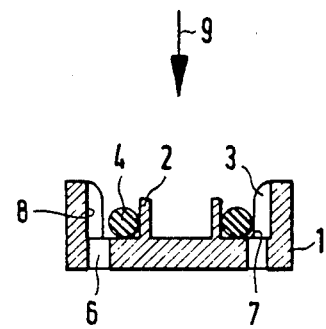
FIG. 3 is a cross-sectional view of a second regulator design with which the invention may also be used.
Figure 4:
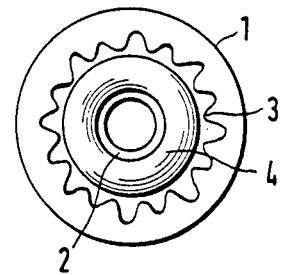
FIG. 4 is a plan view of the regulator shown in FIG. 3, FIGS. 5A, 6A and 7A are various possible flow rate characteristics of an unmatched regulator.

FIGS. 3 and 4 show a different type of regulator, in which, however, the regulating principle is the same as in the regulator of the type shown in FIGS. 1 and 2. FIG. 3 is a cross-sectional view of a casing 1 having formed on the interior surface 8 thereof protuberances 3 with recesses disposed therebetween. The rubber ring 4 surrounds the core 2, which in this embodiment is not profiled. When flow is directed to the regulator from the direction of the arrow 9, the ring will be moved on account of the pressure drop of the liquid along the sliding surface 7 towards the protuberances 3 and—as in the first embodiment of the regulator—will increasingly restrict the flow ports with rising pressure, so that the fluid quantity allowed to pass therethrough is independent of the pressure and constant. The outlet ports are referenced 6.

Figure 5A:
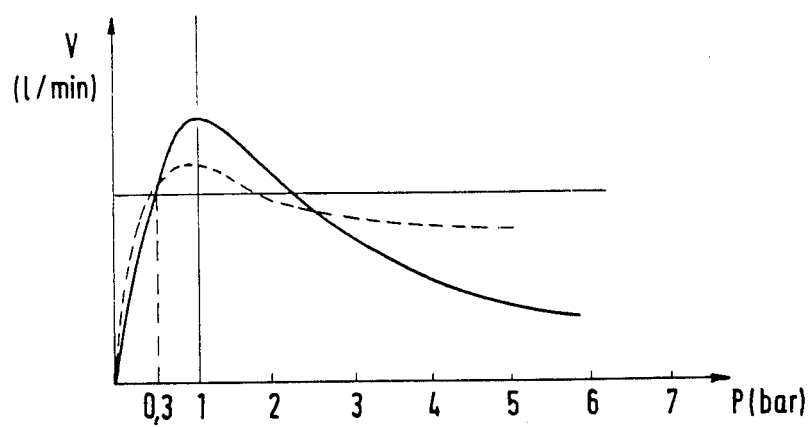
FIGS. 5B, 6B and 7B show where and in what way the casting mould of a regulator of the design shown in FIGS. 1 and 2 has to be machined for matching.
FIGS. 5C, 6C and 7C show where and in what way the casting mould of a regulator of the design shown in FIGS. 3 and 4 has to be machined for matching.
Figure 5B:
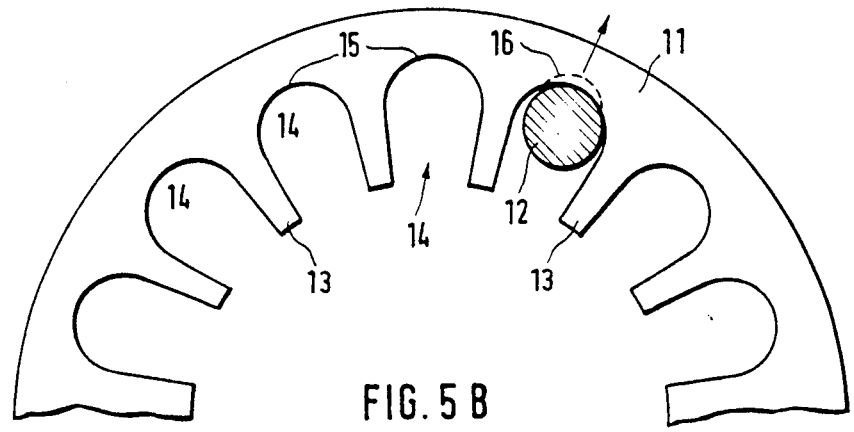
Figure 5C:
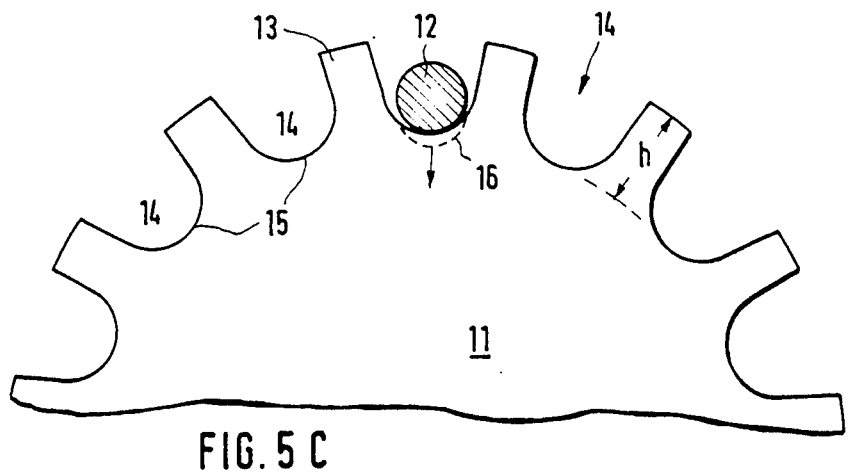

FIG. 5A is a flow characteristic for a sample taken from a casting mould that has not yet been matched. According to the curve the regulator action is such that when a maximum has been reached the regulator will be restricted increasingly with increasing pressure and will further restrict the quantity of water passing therethrough. As the desired value to which the regulator is matched one preferably uses the fluid flow rate which may pass through the regulator at a differential pressure of about 0.3 bar. In the light of the above-specified considerations it may be inferred from the path of the regulator curve that the elastic ring is excessively deflected into the flow ports of the regulator on account of the pressure drop applied thereto. For this reason the corresponding protuberances should protrude to a further extent so that the ring, while it is deflected to the same extent, cannot be moved to the same extent towards the central axis of the regulator. The casting mould, which is a negative image of the regulator core, should therefore be cut in such a way that the protuberances of the core extend further to the outside. The corresponding finishing treatment is sketched in FIG. 5B. In this figure the casting mould of hard metal for the profiled core of the regulator is referenced 11. This casting mould is provided along the inner periphery thereof with hollow chambers 14 spaced from one another by inwardly projecting webs 13. Upon casting of the core plastic material will enter the hollow chambers 14 and will thus form the protuberances of the regulator star. The webs 13 of the casting mould 11 constitute inwardly projecting recesses in the regulator star, which represent the flow ports of the regulator. In a regulator of the second type (FIGS. 3 and 4) the profiled inner surface has the same function as the profiled core in the regulator of the first type (FIGS. 1 and 2). The casting mould, which is a negative image of said inner surface, has the cross-section shown in FIG. 5C. Those parts of the casting mould which correspond to the parts of the casting mould shown in FIG. 5B have the same reference characters. To match a regulator having the regulating characteristic shown in FIGS. 5A and B, one or more of the hollow chambers 14 are made deeper by means of a diamond cutter 12 so that after the machining step they have a profile according to the dotted line 16. The arrow in FIGS. 5B and C indicates the direction in which material is removed by the cutter 12.

Figure 8:
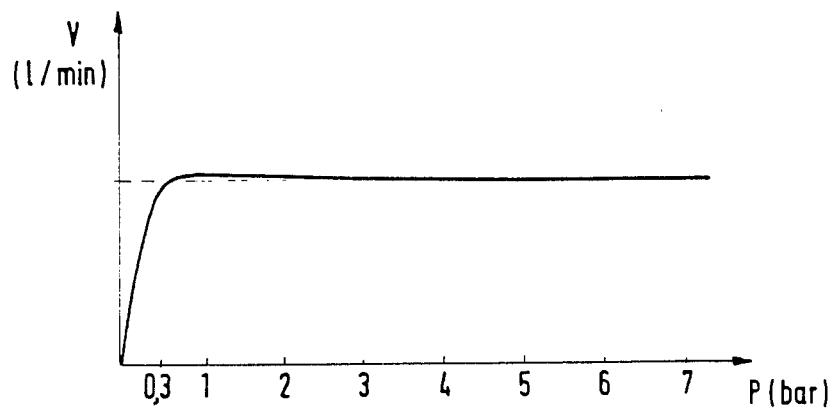
FIGS. 8 and 9 are flow rate characteristics for regulators, the casting mould of which has been matched in accordance with the invention.

Machining is initially performed in only one of the hollow chambers 14. If this is insufficient and if e.g. a flow characteristic according to the dotted line in FIG. 5A is obtained, a corresponding amount of material will be removed from a further hollow chamber 14. The matched casting mould will then result in regulators having a flow characteristic according to FIG. 8, i.e., regulators which reach the desired value at about 0.3 bar and will then with increasing pressure keep the flow rate constant independently of the increasing pressure.

Figure 6A:
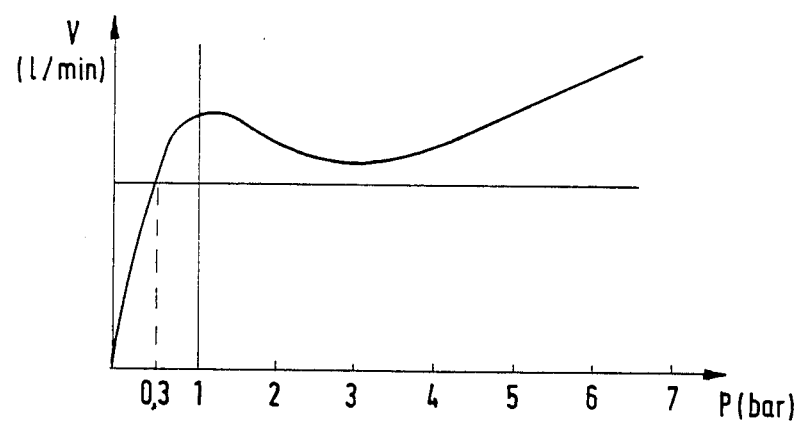
Figure 6B:
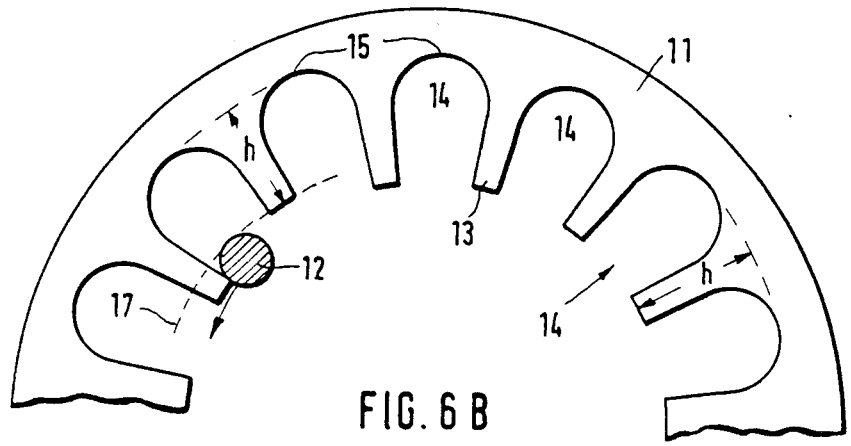
Figure 6C:
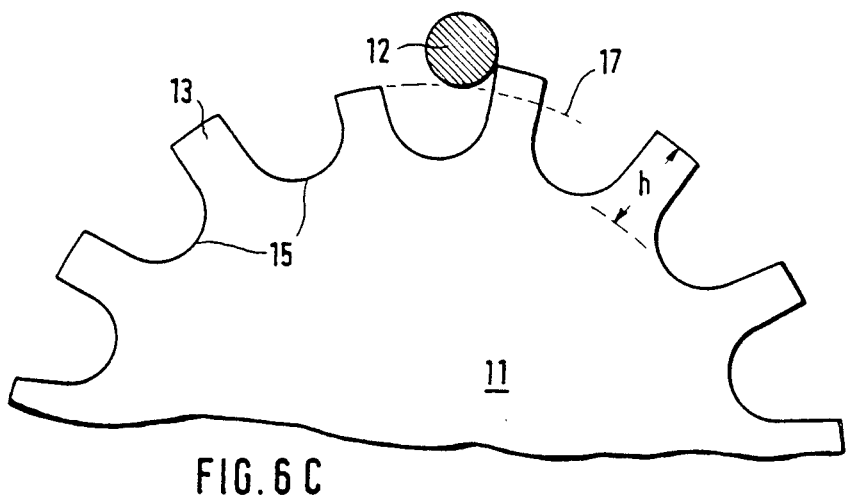

If the first sample taken from a not yet matched casting mould results in a flow rate characteristic according to FIG. 6A, this indicates in accordance with the above explanations that the elastic ring with increasing pressure is unable to move far enough into the flow ports of the regulator. Therefore the size of the flow ports should be reduced, and this is effected by reducing the depth of the recesses or grooves extending between the protuberances of the profiled core. To this end the inwardly projecting webs 13 of the casting mould 11 are machined with a cutter 12 along the dotted line 17 whereby the height h of the webs 13 is reduced (cf. the FIGS. 6B and C).

Figure 7A:
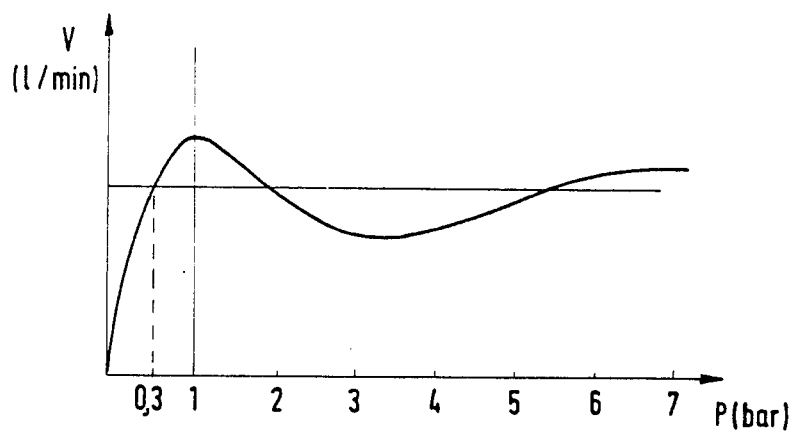
Figure 7B:
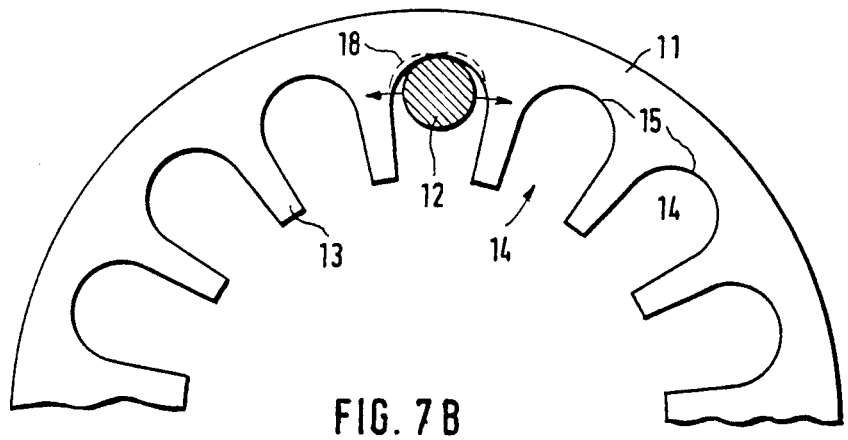
Figure 7C:
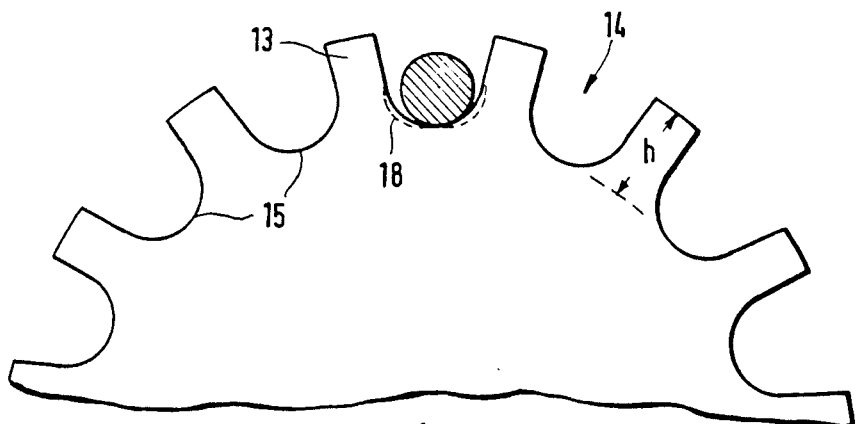

If the regulator sample taken from the not yet matched casting mould has a flow characteristic according to FIG. 7A, which fluctuates about the desired value, the chambers 14 are expanded so that the wall 15 thereof is for instance expanded from circular to oval or elliptic configuration according to the dotted line 18. The arrows in FIGS. 7B and C indicate how the cutting pencil 12 should be moved in this case.

Figure 9:
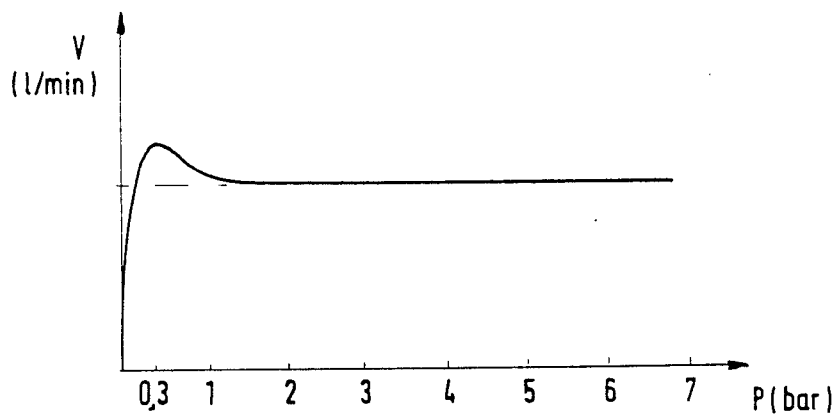

The above-described matching method also permits the making of a regulator exhibiting the flow characteristic shown in FIG. 9. In the pressure range below 1 bar the charcteristic has a maximum in excess of the desired value; with increasing pressure the flow performance is reduced to the desired value and remains constant. Such a regulator action will be useful when a particularly large quantity of water is to be passed already at a low initial pressure. Such a regulator action may be achieved by combining the machining methods according to FIGS. 6B and C and 7B and C, respectively.

The matching of the casting mould is facilitated when the protuberances of the core and of the inner surface of the regulator, respectively, and thus also the chambers 14 of the casting mould do not extend in parallel to the regulator axis but at a small angle of about 10° relative thereto. Such an extension is indicated in FIG. 1 by the dotted surface line 19. In this case a further parameter is available for matching, viz., the point relative to the regulator length where a protuberance of the regulator star—i.e. in the case of the casting mould a hollow chamber 14—is changed.

The above examples and the figures describe embodiments in which the casting mould for the regulator is machined with a cutting tool 12. Instead thereof, EDM methods such as traveling-wire electrical discharge machining or a galvanic (electrolytic) method may also be employed for the matching operation.

What is claimed is:

1. A method for producing fluid flow regulators, which regulators include a housing having interengaging inner and outer housing members, said inner members being in the form of a substantially axial core portion, a plurality of protuberances on said core portion, an elastically deformable sealing member surrounding said core portion and constituting fluid flow passages in cooperation with said protuberances, said sealing member being variably pressed against said protuberances and changing the cross section of said fluid flow passages in response to increasing and decreasing differential pressure values on the medium flow through the regulator, said method comprising the steps of:
    (a) preparing a casting mould for the parts comprising the profiled core, said casting mould being formed with spaced webs which define therebetween hollow chambers corresponding to the protuberances on the core portion, and making a sample regulator;
    (b) measuring the flow characteristics comprising flow rate/differential pressure P for the sample;
    (c) fixing a desired value for the flow rate and matching the regulator to this desired value by adapting the casting mould in accordance with the measured flow characteristics, wherein the matching and adaptation of the casting mould is performed in accordance with the following rules:
    (d) if the flow characteristic of the sample rises with increasing differential pressure P above the desired value and if after passing through a maximum it drops again below the desired value, one or several of the hollow chambers of the casting mould will be made radially deeper so that the height of the protuberances is increased;
    (e) if the flow characteristics of the sample rise with increasing differential pressure P above the desired value and after passing through a maximum drops to a relative minimum above the desired value and thereupon rises again, the webs disposed between the hollow chambers of the casting mould will be made radially shorter so that the recesses disposed between the protuberances of the core will become less deep;
    (f) if the flow characteristic rises with increasing differential pressure P above the desired value and after passing through a maximum drops below the desired value and then rises again above the desired value, one or several of the hollow chambers of the casting mould will be laterally enlarged at the closed end thereof so that the protuberances of the core will become wider in a circumferential direction.

2. The method of claim 1, further including the step of selecting the desired value of rate of flow existing in said regulator at a differential pressure of about 0.2 to about 0.5 bar.

3. The method as claimed in claim 1, wherein the surface lines of the hollow chambers of said casting mould are inclined at an angle of 3° to 15° towards the central axis of the casting mould.

4. The method of claim 1, wherein an electrical discharge machining method is employed for matching the casting mould.

5. The method of claim 4, wherein the electrical discharge method comprises a travelling-wire method.

6. The method of claim 1, wherein an electrolytic method is employed for matching the casting mould.

7. A method for producing fluid flow regulators, which include a housing having a substantial axial core portion and a substantial cylindrical inner surface surrounding said core portion, a plurality of protuberances on said inner surface, an elastically deformable sealing member surrounding said core portion and constituting fluid flow passages in cooperation with said protuberances, said sealing member being variably pressed against said protuberances and changing the cross section of said fluid flow passages in response to increasing and decreasing differential pressure values on the medium flow through the regulator, said method comprising the steps of:

(a) preparing a casting mould for the parts comprising the profiled inner surface, said casting mould being formed with spaced webs which define therebetween hollow chambers corresponding to the protuberances on the profiled inner surface, and making a sample of the regulator;

(b) measuring the flow characteristic comprising the flow rate/differential pressure P for the sample;

(c) fixing a desired value for the flow rate and matching the regulator to this desired value by adapting the casting mould in accordance with the measured flow characteristic; wherein the matching and adaptation of the casting mould is performed in accordance with the following rules:

(d) if the flow characteristic of the sample rises with increasing differential pressure P above the desired value and if after passing through a maximum it drops again below the desired value, one or several of the hollow chambers of the casting mould will be made radially deeper so that the height of the protuberances is increased;

(e) if the flow characteristic of the sample rises with increasing differential pressure P above the desired value and after passing through a maximum drops to a relative minimum above the desired value and thereupon rises again, the webs disposed between the hollow chambers of the casting mould will be made radially shorter so that the recesses disposed between the protuberances of the inner surface will become less deep;

(f) if the flow characteristic rises with increasing differential pressure P above the desired value and after passing through a maximum drops below the desired value and then rises again above the desired value, one or several of the hollow chambers of the casting mould will be laterally enlarged at the closed end thereof so that the protuberances of the inner surface, respectively, will become wider in a circumferential direction.

8. The method as claimed in claim 7, further including the step of selecting the desired value of the rate of flow at a differential pressure of about 0.2 to about 0.5 bar.

9. The method of claim 7, wherein the surface lines of the hollow chambers of said casting mould are inclined at an angle of 3° to 15° towards the central axis of the casting mould.

10. The method of claim 7, wherein an electrical discharge machining method is employed for matching the casting mould.

11. The method as claimed in claim 10, wherein the electrical discharge method comprises a travelling-wire method.

12. The method of claim 7, wherein an electrolytic method is employed for matching the casting mould.

* * * * *